United States Patent
Welch

(10) Patent No.: US 10,533,497 B2
(45) Date of Patent: Jan. 14, 2020

(54) SHORT INLET WITH INTEGRATED LINER ANTI-ICING

(71) Applicant: United Technologies Corporation, Farmington, CT (US)

(72) Inventor: David A. Welch, Quaker Hill, CT (US)

(73) Assignee: United Technologies Corporation, Farmington, CT (US)

( * ) Notice: Subject to any disclaimer, the term of this patent is extended or adjusted under 35 U.S.C. 154(b) by 671 days.

(21) Appl. No.: 15/131,145

(22) Filed: Apr. 18, 2016

(65) Prior Publication Data

US 2017/0298821 A1 Oct. 19, 2017

(51) Int. Cl.
| | | |
|---|---|---|
| F02C 7/047 | (2006.01) |
| F02C 7/24 | (2006.01) |
| F02C 6/08 | (2006.01) |
| F02C 7/30 | (2006.01) |

(52) U.S. Cl.
CPC ............... *F02C 7/047* (2013.01); *F02C 6/08* (2013.01); *F02C 7/24* (2013.01); *F02C 7/30* (2013.01); *F05D 2220/32* (2013.01); *F05D 2260/20* (2013.01); *F05D 2260/60* (2013.01); *F05D 2260/96* (2013.01)

(58) Field of Classification Search
CPC .. F02C 7/045; B01D 25/02; B64D 2033/0206
See application file for complete search history.

(56) References Cited

U.S. PATENT DOCUMENTS

| | | | | |
|---|---|---|---|---|
| 2,636,666 A | * | 4/1953 | Lombard ................ | F02C 7/047 244/134 C |
| 4,738,416 A | * | 4/1988 | Birbragher ............. | B64D 15/04 244/134 B |
| 5,768,778 A | | 6/1998 | Anderson et al. | |

(Continued)

FOREIGN PATENT DOCUMENTS

| | | |
|---|---|---|
| EP | 1318283 A1 | 6/2003 |
| FR | 2952032 A1 | 5/2011 |

(Continued)

OTHER PUBLICATIONS

Peters, Andreas, Zoltán S. Spakovszky, Wesley K. Lord, and Becky Rose. "Ultra-Short Nacelles for Low Fan Pressure Ratio Propulsors." vol. 1A: Aircraft Engine; Fans and Blowers (Jun. 16, 2014) (Year: 2014).*

(Continued)

*Primary Examiner* — William H Rodriguez
*Assistant Examiner* — Rodolphe Andre Chabreyrie
(74) *Attorney, Agent, or Firm* — Carlson, Gaskey & Olds, P.C.

(57) ABSTRACT

A nacelle for a gas turbine engine, the nacelle includes an inlet axially forward of a fan section. The inlet includes an interior surface. A leading edge includes an inlet cavity. A first conduit communicates airflow to the inlet cavity for preventing accretion of ice on the leading edge. An inlet duct is open to the interior surface aft of the inlet cavity. A second conduit is in fluid communication with the first conduit and (Continued)

the inlet duct. The second conduit communicates airflow to the inlet duct for generating film heating airflow over the interior surface for preventing ice accretion. A gas turbine engine is also disclosed.

15 Claims, 3 Drawing Sheets

(56) References Cited

U.S. PATENT DOCUMENTS

| | | | |
|---|---|---|---|
| 6,920,958 B2 | 7/2005 | Harrison | |
| 6,973,193 B1 | 12/2005 | Tse et al. | |
| 7,735,600 B2 | 6/2010 | Strunk et al. | |
| 7,739,865 B2 | 6/2010 | Prasad et al. | |
| 7,923,668 B2 | 4/2011 | Layland et al. | |
| 7,931,235 B2 | 4/2011 | Zanarelli et al. | |
| 8,092,169 B2 | 1/2012 | Cloft et al. | |
| 8,186,942 B2 * | 5/2012 | Haas | B64D 33/02 244/53 B |
| 8,192,147 B2 * | 6/2012 | Haas | B64D 33/02 415/144 |
| 8,209,953 B2 * | 7/2012 | Winter | B64D 33/02 137/15.1 |
| 8,282,037 B2 * | 10/2012 | Jain | B64D 29/00 244/207 |
| 8,353,164 B2 * | 1/2013 | Morford | F02K 1/06 137/15.1 |
| 8,402,739 B2 * | 3/2013 | Jain | F04D 27/0253 137/15.1 |
| 8,408,491 B2 * | 4/2013 | Jain | B64C 23/00 244/53 B |
| 8,448,901 B2 | 5/2013 | Porte et al. | |
| 8,480,350 B2 * | 7/2013 | Winter | F02K 3/06 415/1 |
| 8,657,567 B2 * | 2/2014 | Cloft | B64D 33/02 415/145 |
| 8,794,572 B2 * | 8/2014 | Porte | B64D 33/02 244/1 N |
| 8,960,589 B2 * | 2/2015 | Porte | B64D 15/04 244/1 N |
| 9,010,084 B2 * | 4/2015 | Chelin | B64D 15/04 137/15.1 |
| 9,061,769 B2 * | 6/2015 | Boulet | B64D 33/02 |
| 9,114,884 B2 * | 8/2015 | Chelin | B64C 7/02 |
| 9,353,648 B2 * | 5/2016 | Porte | B64D 15/04 |
| 9,388,767 B2 * | 7/2016 | Porte | B64D 15/04 |
| 9,604,438 B2 * | 3/2017 | Lumbab | G10K 11/161 |
| 9,656,761 B2 * | 5/2017 | Lumbab | B64D 33/02 |
| 9,705,123 B2 * | 7/2017 | Liu | H01M 2/34 |
| 9,708,072 B2 * | 7/2017 | Lumbab | B64D 29/06 |
| 9,777,632 B2 * | 10/2017 | Prather | F01D 25/02 |
| 9,869,190 B2 * | 1/2018 | Niergarth | F01D 7/02 |
| 9,869,203 B2 * | 1/2018 | Thise | F01D 25/02 |
| 9,920,691 B2 * | 3/2018 | Tall, Jr. | F01D 17/162 |
| 9,932,121 B2 * | 4/2018 | Morford | B64D 33/02 |
| 9,938,852 B2 * | 4/2018 | Lumbab | B64D 33/02 |
| 10,017,259 B2 * | 7/2018 | Bouillon | B64D 15/04 |
| 2005/0006529 A1 | 1/2005 | Moe et al. | |
| 2005/0060982 A1 | 3/2005 | Mani et al. | |
| 2005/0082112 A1 | 4/2005 | Harrison | |
| 2006/0011408 A1 | 1/2006 | Kempton et al. | |
| 2008/0112799 A1 * | 5/2008 | Winter | B64D 33/02 415/145 |
| 2008/0185215 A2 | 8/2008 | Strunk | |
| 2009/0056306 A1 | 3/2009 | Suciu et al. | |
| 2009/0120099 A1 | 5/2009 | Brand et al. | |
| 2009/0179448 A1 | 7/2009 | Lota et al. | |
| 2009/0321585 A1 | 12/2009 | Olver et al. | |
| 2012/0031501 A1 * | 2/2012 | Tuan | B64D 33/02 137/15.1 |
| 2012/0048389 A1 * | 3/2012 | Chelin | B64D 15/04 137/15.1 |
| 2012/0192544 A1 * | 8/2012 | Roby | F01D 25/02 60/226.1 |
| 2013/0098471 A1 * | 4/2013 | Porte | F02C 7/04 137/15.1 |
| 2013/0283821 A1 * | 10/2013 | Gilson | F02K 3/06 60/805 |
| 2015/0023780 A1 | 1/2015 | Costa et al. | |
| 2015/0063932 A1 * | 3/2015 | Zubin | B23B 39/20 408/1 R |
| 2016/0032833 A1 | 2/2016 | Robertson, Jr. et al. | |
| 2016/0097323 A1 * | 4/2016 | Prather | F01D 25/02 415/178 |
| 2017/0107906 A1 * | 4/2017 | Oggero | F01D 25/02 |
| 2017/0122204 A1 * | 5/2017 | Versaevel | F02C 7/045 |

FOREIGN PATENT DOCUMENTS

| | | | | |
|---|---|---|---|---|
| WO | WO 2016005711 A1 * | 1/2016 | | F02C 7/045 |
| WO | WO-2016005711 A1 * | 1/2016 | | F02C 7/045 |

OTHER PUBLICATIONS

European Search Report for EP Application No. 17166941.9 dated Aug. 30, 2017.

* cited by examiner

SHORT INLET WITH INTEGRATED LINER ANTI-ICING

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The fan section is disposed within a fan nacelle that defines an inlet for airflow into bypass and core flow paths. The inlet includes a leading edge where ice may form during certain environmental conditions. Ice build-up may alter airflow characteristics and change acoustic and fan performance

SUMMARY

In a featured embodiment, a nacelle for a gas turbine engine, the nacelle includes an inlet axially forward of a fan section. The inlet includes an interior surface. A leading edge includes an inlet cavity. A first conduit communicates airflow to the inlet cavity for preventing accretion of ice on the leading edge. An inlet duct is open to the interior surface aft of the inlet cavity. A second conduit is in fluid communication with the first conduit and the inlet duct. The second conduit communicates airflow to the inlet duct for generating film heating airflow over the interior surface for preventing ice accretion.

In another embodiment according to the previous embodiment, the interior surface includes an acoustic liner aft of the cavity and the inlet duct.

In another embodiment according to any of the previous embodiments, the acoustic liner includes a plurality of cells in communication with a corresponding plurality of openings on the interior surface. The plurality of cells are closed on a back side of the acoustic liner.

In another embodiment according to any of the previous embodiments, the inlet duct is disposed forward of the acoustic liner and aft of the inlet cavity.

In another embodiment according to any of the previous embodiments, the inlet duct includes an annular slot at least partially extending about a circumference of the inlet.

In another embodiment according to any of the previous embodiments, the inlet duct includes a plurality of openings arranged circumferentially about a circumference of the inlet.

In another embodiment according to any of the previous embodiments, the second conduit is an extension of the first conduit.

In another embodiment according to any of the previous embodiments, the second conduit includes a plurality of conduits spaced circumferentially about a circumference of the inlet for supplying airflow to the inlet duct.

In another featured embodiment, a gas turbine engine includes a fan section delivering air into a main compressor section where the air is compressed and communicated to a compressor section where the air is mixed with fuel and ignited to generate a high energy flow that is expanded through a turbine section that drives the fan and main compressor sections. A nacelle is disposed about the fan section. The nacelle includes an inlet axially forward of the fan section. The inlet includes an interior surface and a leading edge including an inlet cavity. A first conduit communicates airflow to the inlet cavity for preventing accretion of ice on the leading edge. An inlet duct is open to the interior surface aft of the inlet cavity. A second conduit is in fluid communication with the first conduit and the inlet duct. The second conduit communicates airflow to the inlet duct for generating film heating airflow over the interior surface for preventing ice accretion.

In another embodiment according to the previous embodiment, the leading edge of the inlet is spaced a distance L from the fan section. The fan section includes a diameter D and a ratio (L/D) of the distance L relative to the diameter D is between 0.25 and 0.55.

In another embodiment according to any of the previous embodiments, airflow is communicated to the first conduit and the second conduit from the main compressor section.

In another embodiment according to any of the previous embodiments, the interior surface includes an acoustic liner aft of the cavity and the inlet duct.

In another embodiment according to any of the previous embodiments, the acoustic liner includes a plurality of cells in communication with a corresponding plurality of openings on the interior surface. The plurality of cells are closed on a back side of the acoustic liner.

In another embodiment according to any of the previous embodiments, the inlet duct is disposed forward of the acoustic liner and aft of the inlet cavity.

In another embodiment according to any of the previous embodiments, the inlet duct includes an annular slot at least partially extending about a circumference of the inlet.

In another embodiment according to any of the previous embodiments, the inlet duct includes a plurality of openings arranged circumferentially about a circumference of the inlet.

In another embodiment according to any of the previous embodiments, the second conduit is an extension of the first conduit.

In another embodiment according to any of the previous embodiments, the second conduit includes a plurality of conduits spaced circumferentially about a circumference of the inlet for supplying airflow to the inlet duct.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figures 1, 2:
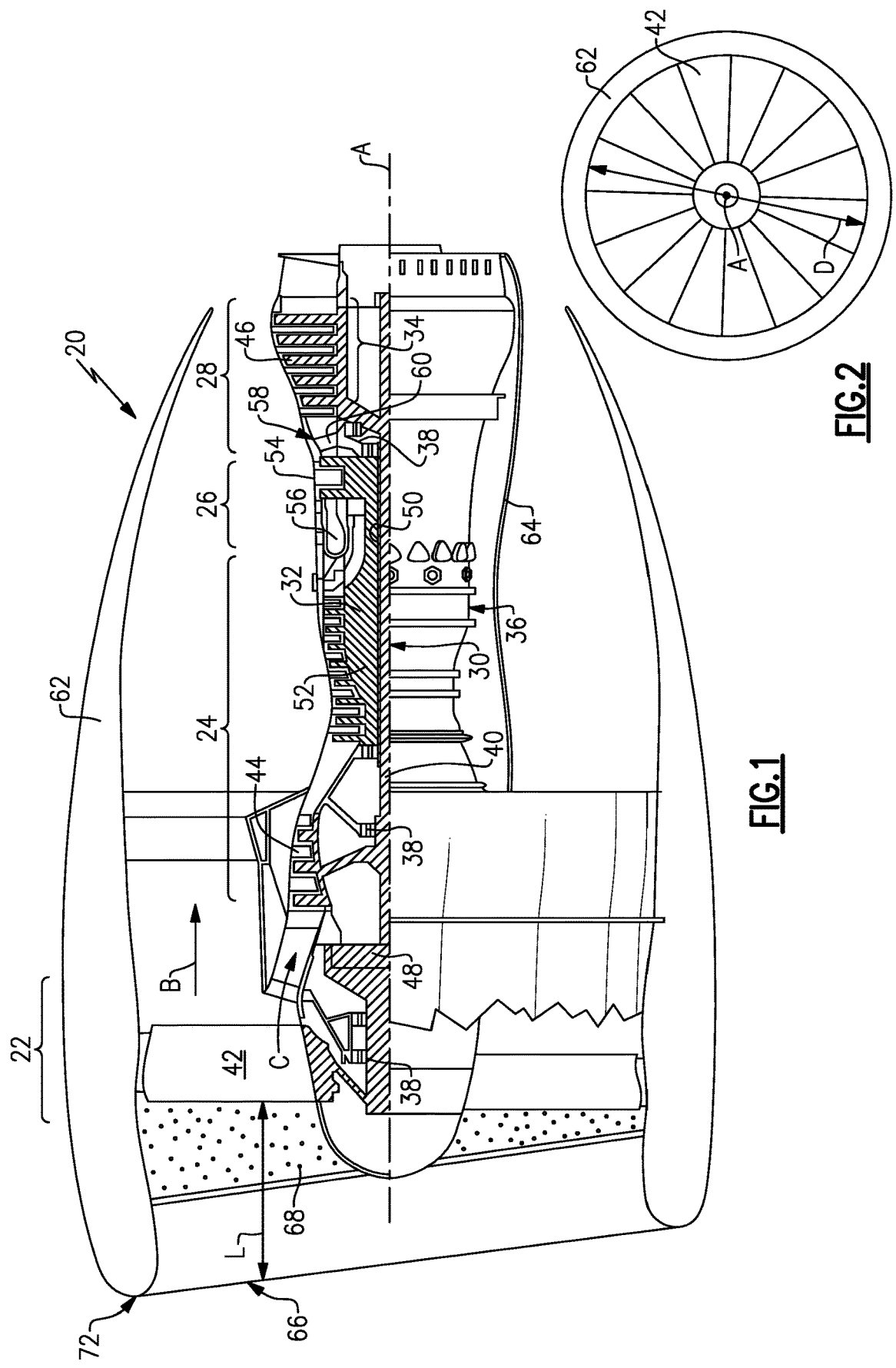
FIG. 1 schematically shows an embodiment of a gas turbine engine.
FIG. 2 schematically shows an embodiment of a front view of the gas turbine engine.

FIGS. 1 and 2 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

The fan section 22 is surrounded by a fan or outer nacelle section 62. The core engine section is surrounded by a core nacelle 64. The fan nacelle 62 surrounds the fan section 22 and fan blades 42. The example nacelle section 62 includes an inlet section 66. The inlet section 66 is forward of the fan section 22 and includes a leading edge 72. The example nacelle 62 includes a short inlet. The short inlet is defined by a ratio between a distance L between a leading edge of the fan blades 42 and the leading edge 72 of the inlet 66 and a diameter D of the fan 22. In a disclosed embodiment the ratio L/D is between about 0.25 and about 0.50. Prior art non-short inlet nacelle structures include an L/D greater than 0.6. The disclosed short inlet provides desired airflow and aerodynamic performance favorable to improving gas turbine engine efficiencies.

Ice buildup on the leading edge 72 or just within the inlet can affect airflow into the fan section and thereby into the engine itself. Moreover, ice accumulation within the inlet 66 may also impact fan performance The disclosed nacelle section 62 includes features for reducing ice accumulation at the inlet 66. The example nacelle structure 62 also includes an acoustic liner 68 disposed forward of the fan section 22 to reduce noise emanating from the engine during operation.

Figure 3:
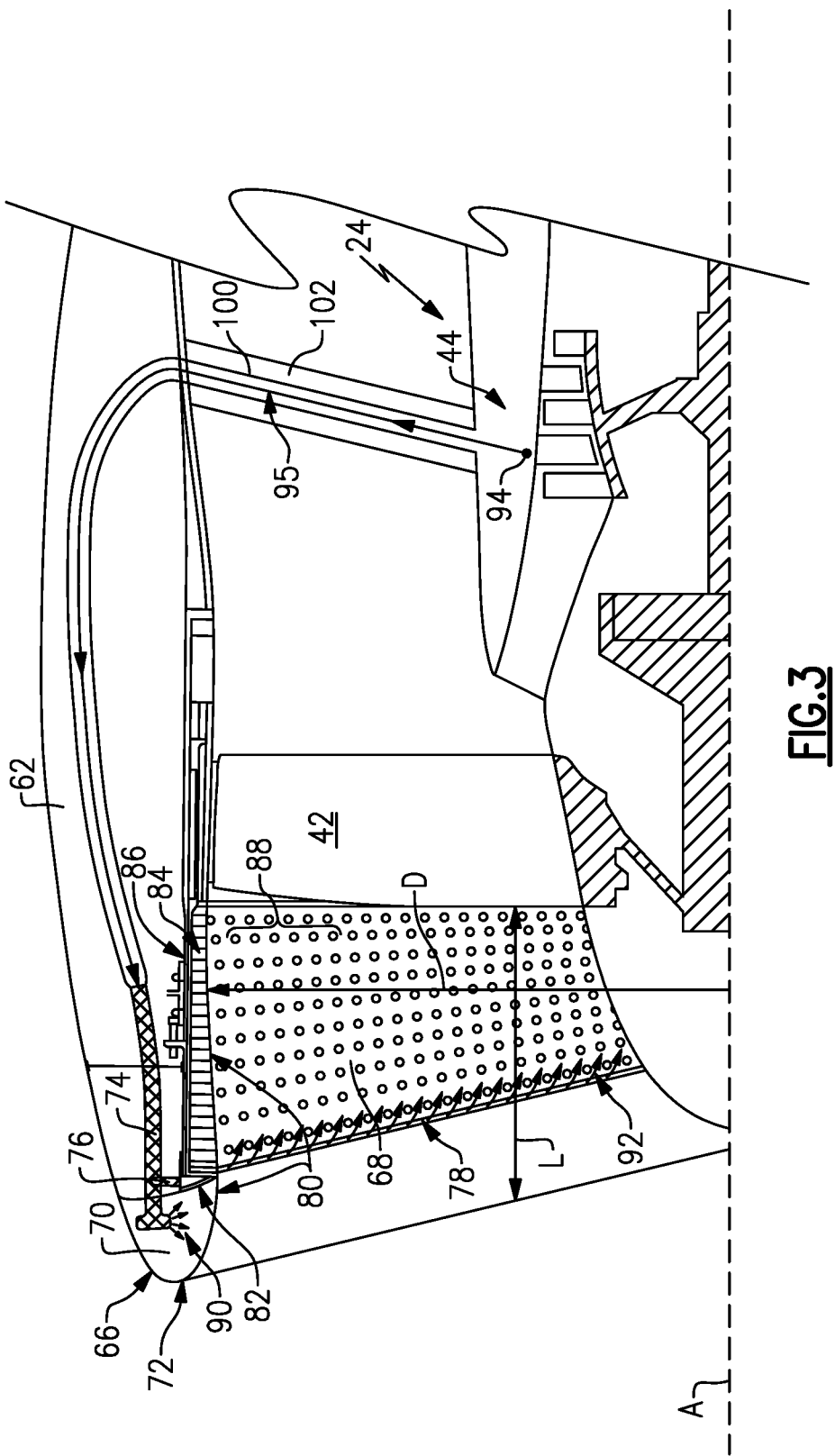
FIG. 3 is an enlarged view of an embodiment of an inlet of a fan nacelle for a gas turbine engine.

Referring to FIG. 3 with continued reference to FIGS. 1 and 2, the example inlet 66 includes the leading edge 72 and a leading edge cavity 70. The example leading edge cavity 70 is an annular cavity disposed about the circumference of the inlet 66. The acoustic liner 68 is disposed within the nacelle 62 and aft of the leading edge 72 and leading edge cavity 70.

The example acoustic liner 68 includes a plurality of openings 88 along an interior surface 80 of the nacelle 62. The interior surface 80 begins at the leading edge 72 and defines the outer radial surface of the bypass flow path B. The acoustic liner 68 forms a portion of this interior surface 80 forward of the fan blades 42. The acoustic liner 68 includes the plurality of openings 88 that open to a corresponding plurality of cells 84. Each of the cells 84 are open to the corresponding opening 88 along the interior surface 80 and are closed along a backside 86 such that airflow does not flow through the acoustic liner 68. Acoustic energy is absorbed by the cells 84 to reduce noise emanating from the nacelle 62.

A first conduit 74 extends into the leading edge cavity 70 and communicates warm airflow 90 into the annular cavity 70. This warm airflow 90 maintains the leading edge cavity 70 and therefore the leading edge 72 at a temperature that prevents or reduces the accumulation of ice at the leading edge 72 and just inside the inlet 66.

The warm air provided within the leading edge cavity 70 may not fully prevent ice buildup along the interior surface 80 and therefore a second conduit 76 is provided and is in communication with the first conduit 74. Although shown as being distinct from the first conduit 74, the second conduit 76 may be an extension of the first conduit 74. The second conduit 76 communicates warm air to an inlet duct 78. The example inlet duct 78 extends about a circumference of the inlet 66 aft of the leading edge cavity 70 and forward of the acoustic liner 68. The inlet duct 78 includes at least one opening generating a film airflow of heated air along the interior surface 80 for substantially preventing accretion of ice during operation.

Warm air is obtained from the main compressor section 24 and supplied to the first conduit 74. In this example, a source of warm air (schematically indicated at 94 within the low pressure compressor 44) communicates warm airflow 95 to the nacelle 62. Warm airflow 95 is communicated from the main compressor section 24 through a series of applicable conduits, schematically represented at 100 and through engine mounting structures 102 such that warm airflow can be communicated to the first conduit 74. In this example, the second conduit 76 is attached to the first conduit 74 to receive warm air that is communicated into the first conduit 74. It should be understood that although warm air to the second conduit 76 is supplied through the first conduit 74, a separate conduit could be utilized to supply warm airflow to the second conduit 76 and thereby the inlet duct 78. Moreover, although a single conduit 100 is schematically shown, multiple conduits could be utilized to communicate warm air from various locations in the engine 20 as desired.

Figure 4:
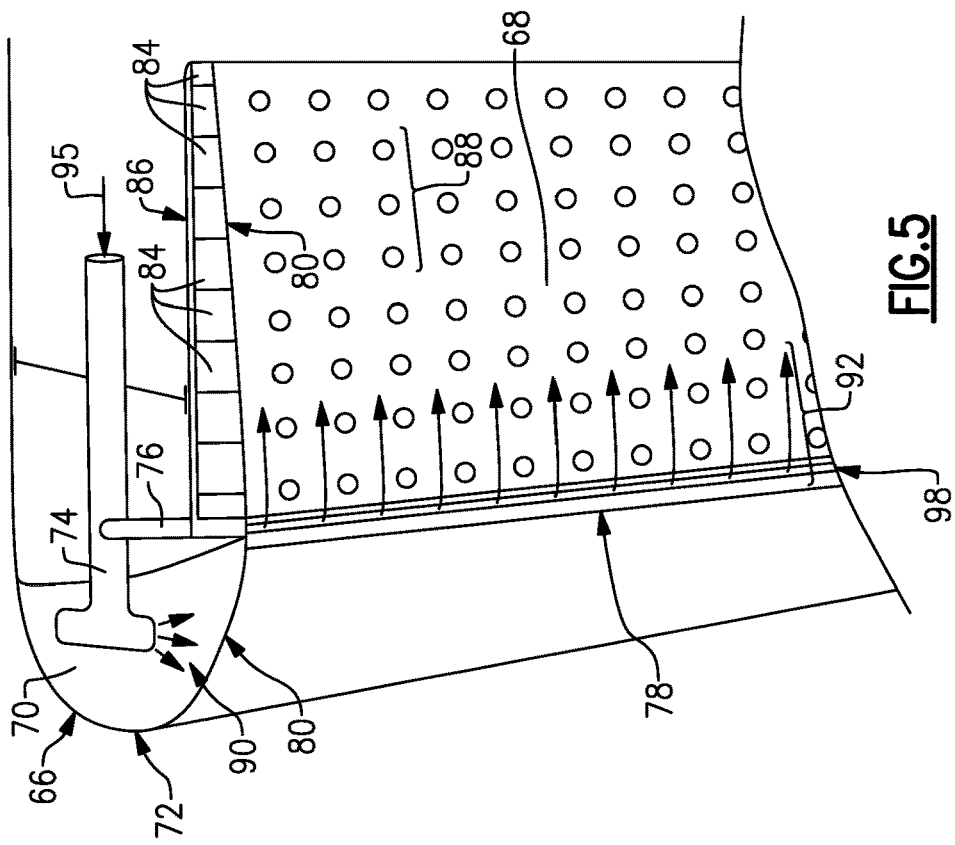
FIG. 4 is an enlarged view of the example fan nacelle.

Referring to FIG. 4 with continued reference to FIG. 3, the example inlet duct 78 comprises a plurality of circumferentially spaced apart openings 96. Each of the openings 96 are supplied through an annular chamber 82 that is in communication with the second conduit 76. Spacing between the plurality of openings 96 is provided to generate a uniform flow of heating airflow across the interior surface 80 including the acoustic liner 68. Airflow communicated through the second conduit 76 and the annular chamber 82 is expelled through the plurality of openings 96 along the interior surface 80 of the inlet 66 and nacelle 62. The film heating airflow 92 is provided at a temperature determined to reduce or eliminate the buildup of ice along the acoustic liner in any portion of the interior surface 80 forward of the fan 42.

In this example, the openings 96 are schematically indicated as being round or circular. However, the specific shape of the openings 96 could be different than a circular opening and may include a plurality of slots, rectangular openings or angled openings to generate and direct the heating film air 92 as desired across the interior surface 80.

Figure 5:
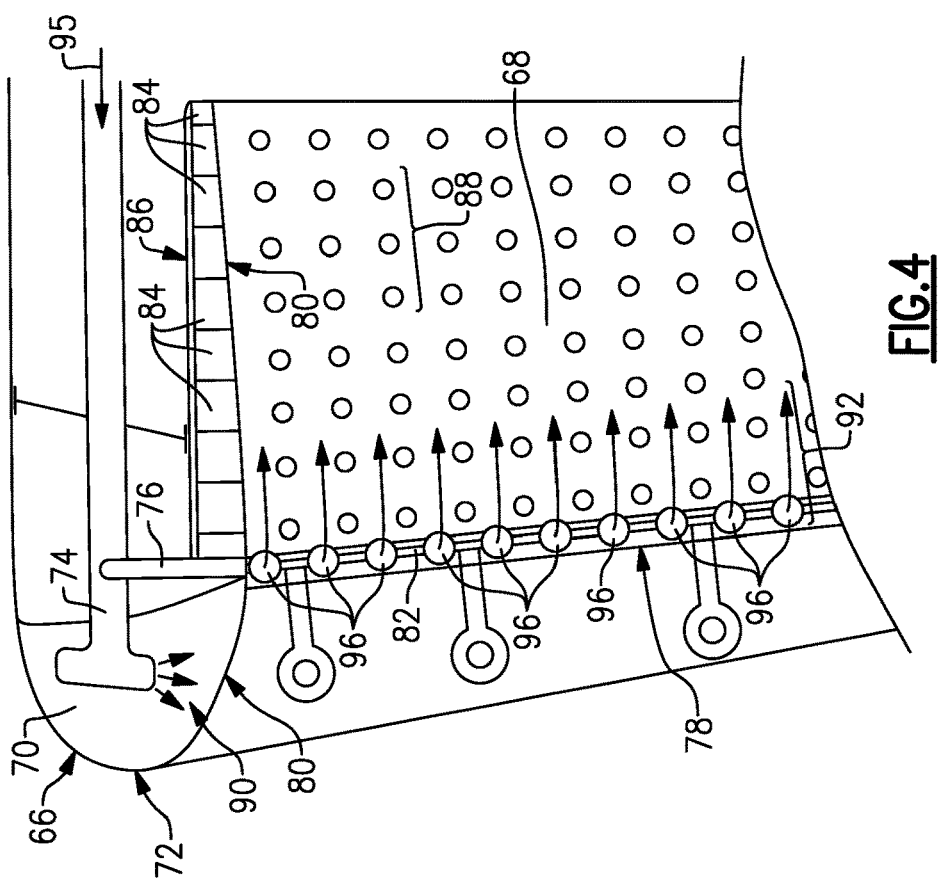
FIG. 5 is an enlarged view of another embodiment of the fan nacelle.

Referring to FIG. 5 with continued reference to FIG. 3, another example inlet duct 78 defines an annular slot 98. The example annular slot 98 is disposed about the circumference of the inner surface 80 of the inlet 66 such that a uniform and continuous stream of film heating airflow 92 is communicated across the acoustic liner 68. The use of the annular slot 98 generates heating film airflow across the entire interior surface 80 and may provide for a simplified assembly and manufacture.

The example short inlet 66 includes features for preventing ice accumulation not only on the leading edge 72 but also along the interior surface 80 including the acoustic liner 68.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A nacelle for a gas turbine engine, the nacelle comprising:
an inlet axially forward of a fan section, the inlet including an interior surface; a leading edge including an inlet cavity;
a first conduit communicating airflow to the inlet cavity for preventing accretion of ice on the leading edge;
an inlet duct separate from the inlet cavity and open to the interior surface aft of the inlet cavity; and
a second conduit extending from the first conduit providing fluid communication with the first conduit through a connection aft of the inlet cavity, the second conduit joining the inlet duct for communicating airflow to the inlet duct for generating film heating airflow over the interior surface for preventing ice accretion.

2. The nacelle as recited in claim 1, wherein the interior surface includes an acoustic liner aft of the inlet duct.

3. The nacelle as recited in claim 2, wherein the acoustic liner includes a plurality of cells in communication with a corresponding plurality of openings on the interior surface, wherein the plurality of cells are closed on a back side of the acoustic liner.

4. The nacelle as recited in claim 1, wherein the inlet duct includes an annular slot at least partially extending about a circumference of the inlet.

5. The nacelle as recited in claim 1, wherein the inlet duct includes a plurality of openings arranged circumferentially about a circumference of the inlet.

6. The nacelle as recited in claim 1, wherein the second conduit comprises a plurality of conduits spaced circumferentially about a circumference of the inlet for supplying airflow to the inlet duct.

7. A gas turbine engine comprising;
a fan section defining a diameter D and including a plurality of fan blades, the fan section delivering air into a main compressor section where the air is compressed and communicated to a combustor section where the air is mixed with fuel and ignited to generate a high energy flow that is expanded through a turbine section that drives the fan and main compressor sections;
a nacelle disposed about the fan section, the nacelle including an inlet axially forward of the fan section, the inlet including an interior surface and a leading edge including an inlet cavity, wherein a leading edge of the inlet is spaced a distance L from a leading edge of the plurality of fan blades and a ratio (L/D) of the distance L to the diameter D is between 0.25 and 0.55;
a first conduit communicating airflow to the inlet cavity for preventing accretion of ice on the leading edge;
an inlet duct open to the interior surface aft of the inlet cavity; and
a second conduit extending from the first conduit to the inlet duct providing fluid communication with the first conduit and the inlet duct, the second conduit communicating airflow to the inlet duct for generating film heating airflow over the interior surface for preventing ice accretion.

8. The gas turbine engine as recited in claim 7, wherein airflow is communicated to the first conduit and the second conduit from the main compressor section.

9. The gas turbine engine as recited in claim 7, wherein the interior surface includes an acoustic liner aft of the cavity and the inlet duct.

10. The gas turbine engine as recited in claim 9, wherein the acoustic liner includes a plurality of cells in communication with a corresponding plurality of openings on the interior surface, wherein the plurality of cells are closed on a back side of the acoustic liner.

11. The gas turbine engine as recited in claim 7, wherein the inlet duct includes an annular slot at least partially extending about a circumference of the inlet.

12. The gas turbine engine as recited in claim 7, wherein the inlet duct includes a plurality of openings arranged circumferentially about a circumference of the inlet.

13. The gas turbine engine as recited in claim 7, wherein the second conduit comprises a plurality of conduits spaced circumferentially about a circumference of the inlet for supplying airflow to the inlet duct.

14. The nacelle as recited in claim 1, wherein the inlet defines a diameter D and a distance L from a leading edge of fan blades within the nacelle to the leading edge and a ratio (L/D) of the distance L to the diameter D is between 0.25 and 0.55.

15. The gas turbine engine as recited in claim 7, wherein the inlet duct is separate from the inlet cavity and the second conduit is connected to the first conduit at a location aft of the inlet cavity.

* * * * *